(12) United States Patent
Berard et al.

(10) Patent No.: US 9,361,470 B2
(45) Date of Patent: Jun. 7, 2016

(54) SECURE ELEMENT COMPRISING SEPARATED CONTAINERS AND CORRESPONDING METHOD

(71) Applicant: GEMALTO SA, Meudon (FR)

(72) Inventors: Xavier Berard, Cadolive (FR); Nicolas Roussel, Meyreuil (FR); Richard Pico, Luynes (FR); Frédéric Faure, Cassis (FR); Benoît Gonzalvo, Roquevaire (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/349,047

(22) PCT Filed: Sep. 18, 2012

(86) PCT No.: PCT/EP2012/068314
§ 371 (c)(1),
(2) Date: Apr. 1, 2014

(87) PCT Pub. No.: WO2013/050240
PCT Pub. Date: Apr. 11, 2013

(65) Prior Publication Data
US 2014/0250501 A1 Sep. 4, 2014

(30) Foreign Application Priority Data

Oct. 3, 2011 (EP) .................................... 11306274

(51) Int. Cl.
| | |
|---|---|
| G06F 15/16 | (2006.01) |
| G06F 21/62 | (2013.01) |
| G06F 21/77 | (2013.01) |
| G06F 9/455 | (2006.01) |
| G06F 21/54 | (2013.01) |
| H04W 12/08 | (2009.01) |

(52) U.S. Cl.
CPC ............... *G06F 21/62* (2013.01); *G06F 9/455* (2013.01); *G06F 21/6218* (2013.01); *G06F 21/77* (2013.01); *G06F 2221/2141* (2013.01); *H04W 12/08* (2013.01)

(58) Field of Classification Search
CPC ..................... H04L 29/06802; H04L 63/0853; G06F 9/45504
See application file for complete search history.

(56) References Cited

U.S. PATENT DOCUMENTS

| 7,552,153 B2* | 6/2009 | Dostert ............... G06F 9/45504 |
| 7,962,545 B2* | 6/2011 | Knauerhase et al. ......... 709/203 |
| 2005/0071824 A1* | 3/2005 | K. N. .................. G06F 11/3636 717/138 |
| 2011/0231912 A1* | 9/2011 | Lee et al. .......................... 726/7 |

FOREIGN PATENT DOCUMENTS

| EP | 2 048 594 A1 | 4/2009 |
| WO | WO 2007079499 A2 * | 7/2007 |

OTHER PUBLICATIONS

International Search Report (PCT/ISA/210) mailed on Oct. 26, 2012, by the European Patent Office as the International Searching Authority for International Application No. PCT/EP2012/068314.
Written Opinion (PCT/ISA/237) mailed on Oct. 26, 2012, by the European Patent Office as the International Searching Authority for International Application No. PCT/EP2012/068314.

* cited by examiner

*Primary Examiner* — Venkat Perungavoor
(74) *Attorney, Agent, or Firm* — Buchanan Ingersoll & Rooney PC

(57) ABSTRACT

The invention is a secure element comprising a virtual machine able to work in admin mode and in runtime mode. The secure element comprises two enhanced containers. Each of said enhanced containers can be either in an activated state or in a disabled state. Only one of the enhanced containers can be in activated state at any given time. The virtual machine is adapted to access each of the enhanced containers when working in admin mode. The virtual machine cannot access an enhanced container which is in disabled state when working in runtime mode.

16 Claims, 3 Drawing Sheets

SECURE ELEMENT COMPRISING SEPARATED CONTAINERS AND CORRESPONDING METHOD

FIELD OF THE INVENTION

The present invention relates to secure elements which comprise several applications. It relates particularly to secure elements comprising a virtual machine and applications in separated containers.

BACKGROUND OF THE INVENTION

Secure elements are small devices comprising a memory, a microprocessor and an operating system for computing treatments. Such secure elements may comprise a plurality of memories of different types. They are called "secure" because they are able to control the access to the data they contain and to authorize or not the use of data by other machines. The secure elements may also provide computation services based on cryptographic components. In general, secure elements have limited computing resources and are intended to be connected to a host machine. Secure elements may be removable or fixed to a host device. Smart cards are portable secure elements.

The secure elements may embed an object-oriented virtual machine in order to be able to run applications written in an object-oriented language. Usually, these object-oriented applications manage applicative data which are stored into the secure element. For instance, many smart cards comprise a virtual machine and applets compliant with Javacard® specifications. The applications which are stored and installed into a secure element are usually referred to through an identifier. Such an identifier may be an Application IDentifier (AID) as defined by ISO7816-5 standard for example. An application is usually managed through a package which is loaded in the secure element. Then an instance of the application is created in the secure element. An AID is used for identifying each application package. An AID is used for identifying each application instance. Until now each AID of application package and each AID of application instance must be unique in a secure element. The uniqueness of each AID allows avoiding ambiguity when referring to an element in a secure element. The virtual machine manages both the administration and the interpretation/execution of the applications. The administration corresponds to the loading, the creation/instantiation, the upgrading and the removing of application.

A new need arise for the management of secure elements intended to contain a plurality of applications. It is now asked to download and to install the same application multiple times on the same element. This raises the question of the uniqueness of identifiers embedded in a single secure element.

There is a need for improving the capability to manage several applications which use the same identifier into a secure element.

SUMMARY OF THE INVENTION

An object of the invention is to solve the above mentioned technical problem.

The object of the present invention is a secure element comprising a virtual machine able to work in admin mode and in runtime mode. The secure element comprises two enhanced containers. Each of said enhanced containers can be either in an activated state or in a disabled state. One of the enhanced containers can be in activated state at any given time. The virtual machine is adapted to access each of the enhanced containers when working in admin mode. The virtual machine cannot access an enhanced container which is in disabled state when working in runtime mode.

Advantageously, the secure element may comprise a common container which may be always in the activated state independently of the enhanced containers. The virtual machine may be adapted to access the common container when working in runtime mode.

Advantageously, the secure element may comprise a communication interface and a switch means adapted to activate one of the enhanced containers in response to a dedicated command received through the communication interface.

Advantageously, a first application may have been installed in each of said enhanced containers by using the same application identifier (AID) in both enhanced containers.

Advantageously, the secure element may comprise a global registry containing an identifier associated to a second application. The virtual machine may be adapted to access the global registry when working in runtime mode. Each of said enhanced containers may comprise its own associated local registry, each local registry containing the identifier of said first application.

Advantageously, each of said enhanced containers may comprise data related to a subscription.

Advantageously, each of the enhanced containers may be managed via a security domain as defined by GlobalPlatform® standard.

Advantageously, the secure element may be a smart card, a eUICC or a Machine-To-Machine device.

Another object of the invention is a method for managing a secure element. The secure element comprises first and second enhanced containers and a virtual machine which is able to work in admin mode and in runtime mode. The method comprises the following steps:
    activating first enhanced container, said second enhanced container being automatically disabled, wherein the virtual machine cannot access an enhanced container which is disabled when working in runtime mode,
    loading an application into the second enhanced container while said second enhanced container remains disabled.

Advantageously, the activating step may be triggered by the receipt of a dedicated command.

Another object of the invention is a system comprising a machine and a secure element according to the invention (as described above). The machine comprises a selection means that is adapted to generate a dedicated command for triggering the activation of one of the enhanced containers comprised in the secure element.

Advantageously, the machine may comprise a manager means adapted to generate a specific command for triggering the creation of a new enhanced container in the secure element.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of secure element comprising a virtual machine. Although the following embodiments are given for a Javacard® virtual machine, the invention may apply to any kinds of virtual machine.

Figure 1:
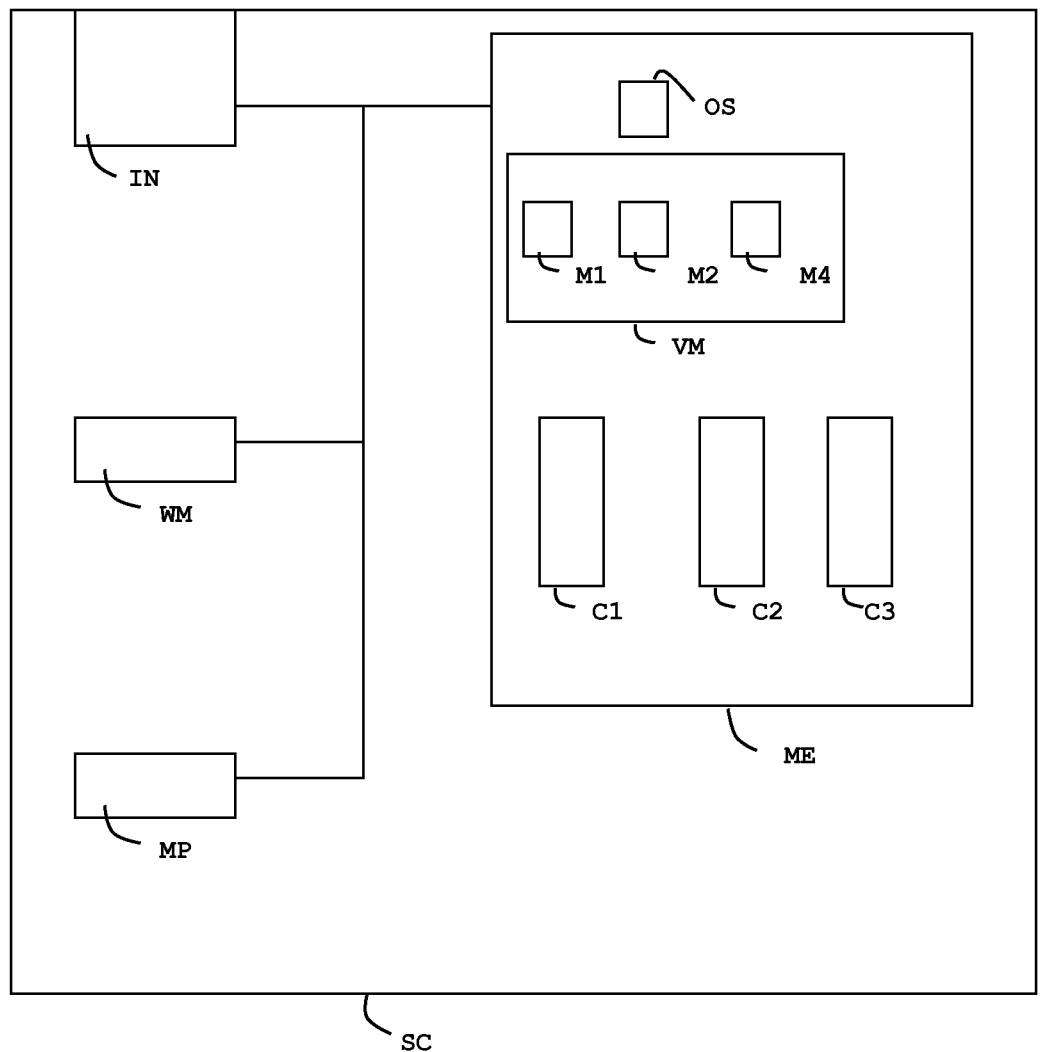
FIG. 1 depicts schematically an example of architecture of a secure element according to the invention.

FIG. 1 shows the architecture of a secure element SC of smart card type according to the invention. In this example, the secure element SC is a Java Card® smart card.

The secure element SC comprises a working memory WM, a non volatile memory ME, a microprocessor MP and a communication interface IN. The non volatile memory ME comprises an operating system OS, an object-oriented virtual machine VM, a switch means M1, an admin means M2, a boot means M4, two enhanced containers C1 and C2 and a common container C3. The secure element SC is intended to comprise a plurality of object-oriented application compiled in intermediate code (e.g. in bytecode). These applications are intended to be run by the virtual machine VM. In a preferred embodiment these applications are JavaCard® applets. The smart card SC is intended to be connected to a host machine through the communication interface IN. For example, the host machine may be a personal computer or a mobile phone. The interface IN may be a wireless interface or a contact interface.

The working memory WM may be a RAM. The memory ME may be NAND, flash or EEPROM memory or another type of non volatile memory.

In a preferred embodiment, the memory ME is implemented as a unique memory component.

Alternatively, the memory ME may be implemented thanks to several memory components.

Each of the enhanced containers C1 and C2 is an independent logical area. The common container C3 is also an independent logical area. All applications and applicative data are assumed to be stored in a either an enhanced container or the common container. All elements of the file system are assumed to be stored in a either an enhanced container or the common container.

When an enhanced container is active, all other enhanced containers are disabled. The common container C3 remains always active.

The switch means M1 is capable of activating a targeted enhanced container and to deactivate the previously active enhanced container. The switch means M1 may be activated by a dedicated command DC1 received from an external machine. The dedicated command DC1 may contain the identifier of the targeted enhanced container to be activated. Advantageously, the switch means M1 may automatically activate a preset enhanced container when the secure element SC is started.

Advantageously, the switch means M1 may be able to compute an authorization data based on a secret key previously stored in the secure element. The switch means M1 may be capable of authorizing the activation of an enhanced container only if the computed authorization data is correct. Alternatively, the switch means M1 may be able to check that a secure session has been established with a trusted remote server or a connected host machine. Alternatively, the switch means M1 may be able to check that particular rights have been granted in the secure element SC.

When working in runtime mode, the virtual machine VM cannot access enhanced containers which are disabled. In this case, the enhanced containers which are in disabled state are hidden and cannot be seen or accessed by the virtual machine. In other words, the content of the disabled enhanced containers is not reachable by the virtual machine. The virtual machine is considered in runtime mode when the virtual machine runs (or is about to run) an application written in intermediate language. In runtime mode, the virtual machine can only access the content of the active enhanced container and the content of the common container. Thus, in runtime mode, the virtual machine can only access the content of a single enhanced container at a given time.

A possible alternative would be that, in runtime mode, the virtual machine could access the content of several enhanced containers, each access being separated from the others, e.g. through a dedicated smartcard logical channel. In this way, it would be possible to have simultaneously several active enhanced containers, the common container being accessible from each logical channel simultaneously.

When working in Admin mode, the virtual machine VM can access all existing enhanced containers whatever their state. The virtual machine is considered in admin mode when the virtual machine performs (or is about to perform) treatments related to the administration of the secure element SC. For example, administration treatments may be the downloading of an application (or a package comprising an application), treatments related to the instantiation of an application written in intermediate language, personalization of an application, upgrading of an application, deletion of an application, creation of a file or creation of a new enhanced container.

The admin means M2 is capable of creating a new enhanced container or an application or a file system element into a targeted enhanced container. The admin means M2 can access both active and disabled enhanced containers. The admin means M2 can also access the common container C3. The admin means M2 may be triggered by a specific command DC2 received from an external machine. The specific command DC2 may contain the identifier of the enhanced container to be created or the identifier of the enhanced container wherein a new application or file system element is to be created.

The admin means M2 is capable of loading an application (or the package of an application) of instantiating an application, of creating a file or a file system, of updating a file of updating an application or an applicative data.

The virtual machine VM comprises both means M1 and M2.

A secure element SC is not limited to two enhanced containers and may comprise any number of enhanced containers.

Figure 2:
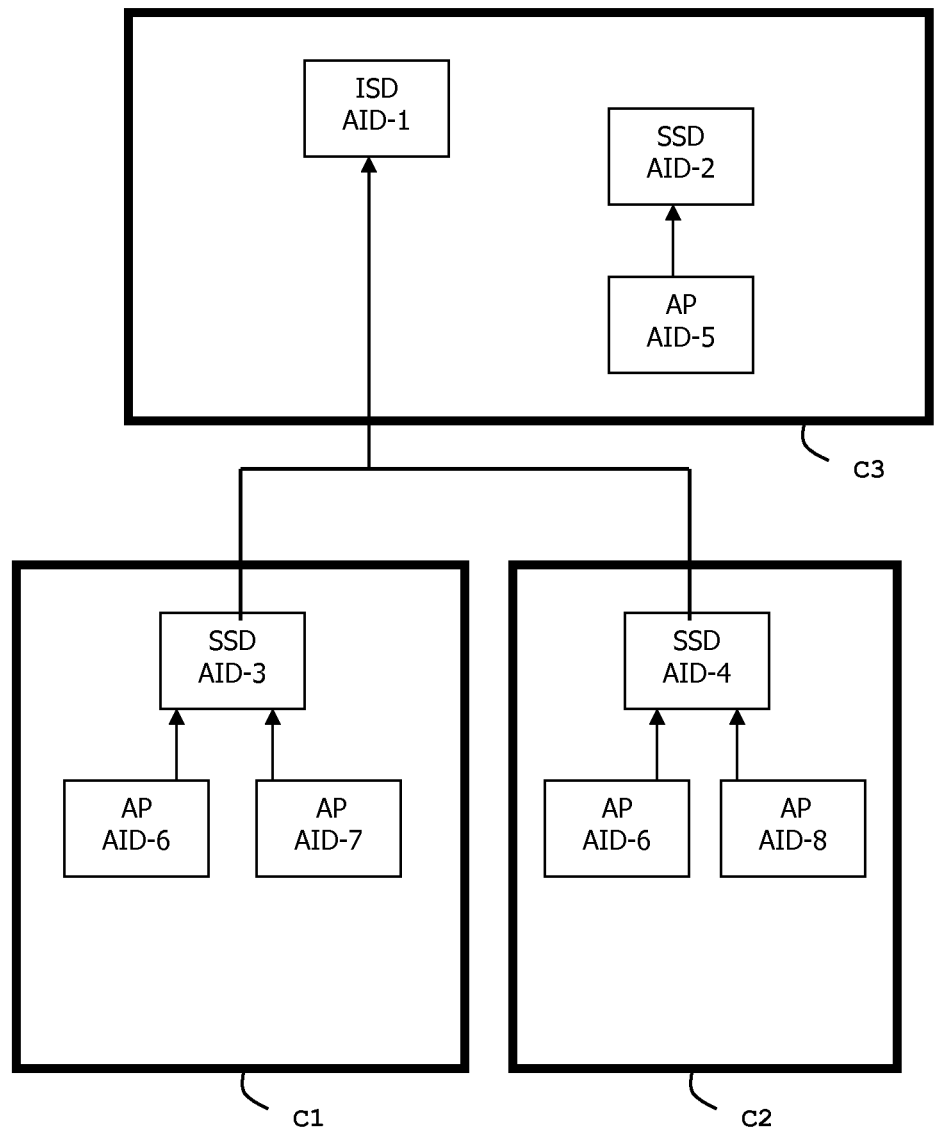
FIG. 2 is an example of three containers embedded in a secure element according to the invention.

FIG. 2 shows an example of embodiment of three containers C1, C2 and C3 which are embedded in the secure element SC according to the invention. C1 and C2 are enhanced containers. C3 is a common container.

In this embodiment, the containers are implemented through the security domain mechanism as defined by Card Specifications of GlobalPlatfom® V2.2 standard.

The common container C3 comprises the issuer security domain (also called ISD) and a supplementary security domain (also called SSD). The identifier of the issuer security domain is AID-1. The identifier of the supplementary security domain is AID-2. The supplementary security domain comprises an application (also called AP) whose AID is AID-5.

The enhanced container C1 comprises a supplementary security domain whose identifier is AID-3. This supplementary security domain comprises two applications whose AID are AID-6, respectively AID-7.

The enhanced container C2 comprises a supplementary security domain whose identifier is AID-4. This supplementary security domain comprises two applications whose AID are AID-6, respectively AID-8.

It should be noted that both C1 and C2 contain an application with the same identifier (i.e. AID-6). According to the invention, only one enhanced container may be active at any given time. According to the invention, when the virtual machine VM is in runtime mode, said virtual machine VM does see only the active enhanced container and the common container C3. Consequently, there is no ambiguity when the virtual machine VM must run the application whose identifier is AID-6.

According to the invention, when the virtual machine VM is in loading mode, said virtual machine VM does see all existing enhanced containers.

A mechanism based on several registries can be used to correctly differentiate the identifier of each application. For example the common container C3 may have a global registry and each enhanced container may have its own local registry.

The global registry may contain the identifier of all elements (e.g. applications, packages, security domain) which are present in the common container C3. The global registry may also contain the identifier of all existing enhanced containers. Advantageously, the global registry may also contain a reference to the local registry of each existing enhanced containers.

A local registry contains the identifier of all elements (e.g. applications, packages, security domain) which are present in the enhanced container associated to this local registry.

Alternatively, there is only a global registry (i.e. no need of local registry) which contain the identifier of all elements existing in all containers. In this case, the AID-6 occurs twice in the global registry: once linked to AID-3 and second linked to AID-4 in order to clearly distinguish both applications which share the same identifier.

A new application whose identifier is AID-7 may be loaded an instantiated in the enhanced container C2. Even if an application having the AID-7 identifier is already installed into the enhanced container C1. This new application may be downloaded in the secure element SC through usual ways. For instance, if the secure element SC is a eUICC (embedded Universal Integrated Circuit Card), the application may be sent through the Over-The-Air (OTA) mechanism has defined in Telecom standards. If the secure element SC is connected to a host machine which may access the Internet, the application may be sent through Internet and other networks.

The specific command DC2 may be sent to the RAM (Remote Application Management as defined by ETSI 102.226 standard) entity associated with the targeted enhanced container.

Advantageously, each enhanced container may be dedicated to a subscription. In this case, the enhanced container comprises all elements which correspond to the subscription. These elements may be any combination of a set of applications, a set of secret data, a set of applicative data, a set of administration data, a set of files structured in a file system, etc. For instance the enhanced container C1 may correspond to a Telecom subscription and the enhanced container C2 may correspond to a Banking subscription. In another example, the container C1 may correspond to a professional Telecom subscription and the container C1 may correspond to a private Telecom subscription with the same Mobile Network Operator. In this case both subscriptions are assumed to comprise many identical elements.

The enhanced containers may be implemented through any logical or physical mechanism which allows identifying a set of elements that are managed thank to common rules.

Figure 3:
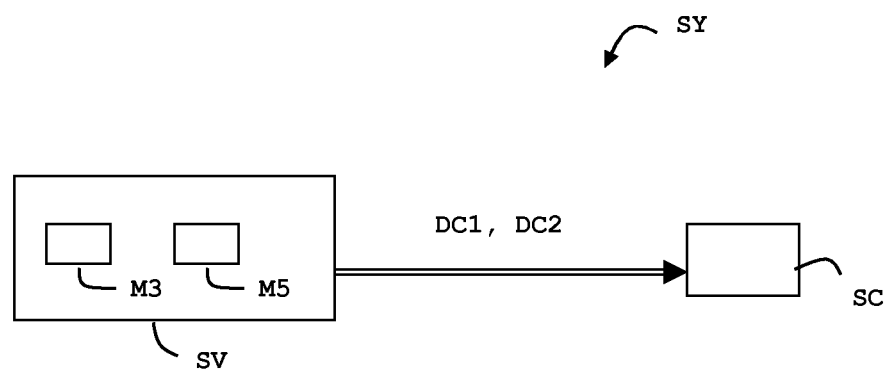
FIG. 3 is an example of a system comprising a server able to manage the activation of a container in a secure element according to the invention.

FIG. 3 shows an example of a system SY comprising a server SV able to trigger the activation of an enhanced container in a secure elements SC according to the invention.

The invention is well suited for allowing a remote server to trigger the activation of a targeted enhanced container into a secure element which is already deployed on the field. For example, the secure element may be a Machine-To-Machine module or any kind of smart cards.

The distant server SV accesses the secure element SC through a network which may be based on a private or public network. For instance, the server SV may use a Telecom network (belonging to a Mobile Operator) when reaching a secure element. The server SV comprises a selection means M3 adapted to generate a dedicated command DC1 intended to trigger the switch means M1 of the secure element SC. The command DC1 built by the selection means M3 contain the relevant identifier of the targeted enhanced container. The enhanced container may have a dedicated identifier allocated by the secure element or the remote server at creation time. Alternatively, in case of enhanced container implemented through security domain, the AID of the enhanced container may be the AID of its corresponding security domain. For instance, the command DC1 may contain AID-4 as identifier if the activation of the enhanced container C2 is required.

The server SV comprises a manager means M5 adapted to generate a specific command DC2 intended to trigger the admin means M2 of the secure element SC. Advantageously, the command DC2 built by the manager means M5 may contain the identifier of the new enhanced container.

Advantageously, the server SV may also be able to directly send the command DC1 to the secure element. Alternatively, the command DC1 may be sent to the secure element SC by an intermediary machine.

In the case of Machine-To-Machine module, the server SV may access the secure element through either Internet or a wireless network or any existing channel.

The specific command DC2 may be implemented through a "Install for install" command as defined by GlobalPlatform® V2.2 for example by using a particular privilege. For instance, the Authorized Management privilege may be used with a difference versus GP 2.2: there is no right to delete ancestors.

The dedicated command DC1 may implemented through a "Set Status" command as defined by GlobalPlatform® V2.2 by using "Personalized status".

Advantageously, the virtual machine VM may comprise a boot means M4 which allow the secure element SC to start without existing enhanced container. Once the secure element has booted via the boot means M4, the admin means M2 may be triggered to create a first enhanced container in response to receiving the command DC2.

As described above, one application may be instantiated in several enhanced containers by using the same identifier. Thanks to the invention, there is no concern for conflicting identifiers. In the same way, one application package may be loaded in several enhanced containers by using the same identifier.

According to the invention, the secure element SC manages itself the existence of several components with identical identifiers. The external machines (e.g. remote server, or connected host machine) do not have to worry about collision of identifier between distinct enhanced containers. The external machines just need to ensure the uniqueness of identifier within the same enhanced container.

The invention claimed is:

1. A secure element comprising:
two enhanced containers, where (i) each of said enhanced containers can be either in an activated state or in a disabled state and (ii) only one of said enhanced containers can be in the activated state at any given time; and
an object-oriented virtual machine able to work in an admin mode and in a runtime mode,
the virtual machine being able to access each of said enhanced containers when working in admin mode, irrespective of the state of said enhanced containers,
wherein the virtual machine cannot access an enhanced container which is in disabled state when working in runtime mode; and
an admin means configured to store an instance of a same first application in each of said enhanced containers using a same identifier,
wherein said secure element comprises a global registry containing an identifier associated with a second application, wherein the virtual machine is configured to access the global registry when working in runtime mode, and wherein each of said enhanced containers comprises its own associated local registry, each local registry containing the identifier of said first application.

2. A secure element according to claim 1, wherein said secure element comprises a common container which is always in the activated state independently of said enhanced containers, and wherein the virtual machine is configured to access said common container when working in runtime mode.

3. A secure element according to claim 1, wherein said secure element comprises a communication interface and a switch means configured to activate one of said enhanced containers in response to a dedicated command received through the communication interface.

4. A secure element according to claim 1, wherein each of said enhanced containers comprises data related to a subscription.

5. A secure element according to claim 1, wherein each of said enhanced containers is managed via a security domain as defined by GlobalPlatform® standard.

6. A secure element according to claim 1, wherein said secure element is a smart card, an eUICC or a Machine-To-Machine device.

7. A system comprising a machine and a secure element, wherein the secure element is according to claim 1 and said machine comprises a selection means adapted to generate a dedicated command for triggering the activation of one of the enhanced containers of the secure element.

8. A system according to claim 7, wherein said machine comprises a manager means configured to generate a specific command for triggering the creation of a new enhanced container in the secure element.

9. A secure element comprising:
two enhanced containers, where (i) each of said enhanced containers can be either in an activated state or in a disabled state and (ii) only one of said enhanced containers can be in the activated state at any given time; and
a virtual machine able to work in an admin mode and in a runtime mode,
the virtual machine being able to access each of said enhanced containers when working in admin mode, and
wherein the virtual machine cannot access an enhanced container which is in disabled state when working in runtime mode;
an admin means configured to store an instance of a same first application in each of said enhanced containers using a same identifier; and
a global registry containing an identifier associated with a second application,
wherein the virtual machine is configured to access the global registry when working in runtime mode, and
wherein each of said enhanced containers comprises its own associated local registry, each local registry containing the identifier of said first application.

10. A secure element according to claim 9, wherein said secure element comprises a common container which is always in the activated state independently of said enhanced containers, and wherein the virtual machine is configured to access said common container when working in runtime mode.

11. A secure element according to claim 9, wherein said secure element comprises a communication interface and a switch means configured to activate one of said enhanced containers in response to a dedicated command received through the communication interface.

12. A secure element according to claim 9, wherein each of said enhanced containers comprises data related to a subscription.

13. A secure element according to claim 9, wherein each of said enhanced containers is managed via a security domain as defined by Global Platform® standard.

14. A secure element according to claim 9, wherein said secure element is a smart card, an eUICC or a Machine-to-Machine device.

15. A system comprising a machine and a secure element, wherein the secure element is according to claim 9 and said machine comprises a selection means adapted to generate a dedicated command for triggering the activation of one of the enhanced containers of the secure element.

16. A system according to claim 15, wherein said machine comprises a manager means configured to generate a specific command for triggering the creation of a new enhanced container in the secure element.

* * * * *